United States Patent Office 3,158,630
Patented Nov. 24, 1964

3,158,630
2,19-CYCLO STEROIDS AND PROCESS THEREFOR
Alexander D. Cross, Mexico City, Mexico, assignor to Syntex Corporation, Panama, Panama, a corporation of Panama
No Drawing. Filed Oct. 19, 1962, Ser. No. 231,827
21 Claims. (Cl. 260—397.4)

The present invention relates to novel cyclopentanophenanthrene derivatives and to a process for the production thereof.

More particularly, the present invention relates to novel 2,19-cyclo-androstane derivatives and to a novel process for the production of 2,19-cyclo steroids.

The novel compounds object of the present invention are represented by the following formulas:

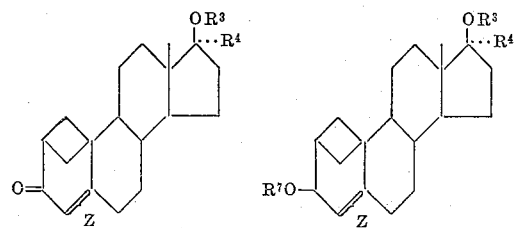

In the above formulae $R^3$ and $R^7$ each represents hydrogen or a hydrocarbon carboxylic acyl group of less than 12 carbon atoms; $R^4$ represents hydrogen, lower alkyl, lower alkenyl or lower alkinyl; and Z represents a double bond or a saturated linkage between C–4 and C–5.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention represented by the above formulas are anabolic-androgenic agents with a favorable anabolic-androgenic ratio. In addition, they have anti-estrogenic, anti-gonadotrophic, anti-fibrillatory and appetite stimulating properties. Furthermore, they lower the blood cholesterol level, relieve premenstrual tension, and suppress tthe output of the pituitary gland.

The novel process for the production of 2,19-cyclo steroids, which is one of the objects of the present invention, is represented by the following scheme:

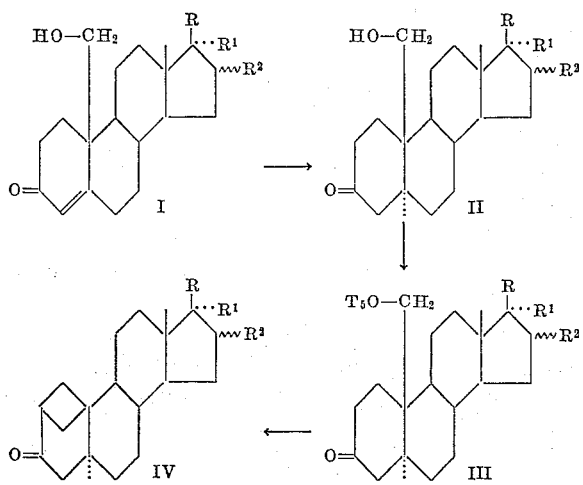

In the above formulae, R represents an acyloxy group, a hydroxyl group, an acetyl group or the dihydroxyacetone side chain, preferably protected by a 17,20;20,21-bismethylenedioxy grouping; $R^1$ may be hydrogen, hydroxyl or a hydrocarbon carboxylic acyloxy group of less than 12 carbon atoms; when R is hydroxyl or acyloxy, $R^1$ may be a lower alkyl group; R and $R^1$ together may represent a keto group, a bis-alkoxy group, or a cycloalkylenedioxy grouping; $R^2$ may represent hydrogen, α-methyl, β-methyl, α-hydroxy, or an α-acyloxy group derived from a hydrocarbon carboxylic acid of less than 12 carbon atoms; $R^1$ and $R^2$ together represent the group

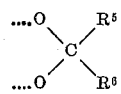

wherein $R^5$ and $R^6$ each represent hydrogen or a hydrocarbon residue of up to 8 carbon atoms of straight, branched, cyclic, mixed aliphatic-cyclic chain, or aromatic, such as methyl, ethyl, isopropyl, phenyl, methylcyclohexyl and the like; and TsO represents a hydrocarbon sulfoxy group of up to 8 carbon atoms.

The starting compound (I) of the above outline process, which is a 19-hydroxy-Δ⁴-3-keto steroid may be obtained from the corresponding 3β-acyloxy-Δ⁵-compound by treatment with hypobromous acid, reaction of the resulting 5α-bromo-6β-ol with lead tetraacetate, treatment of the resulting acylate of the corresponding 5α-bromo-6β,19-oxido steroid 3β-ol with zinc in a lower aliphatic alcohol, hydrolysis in a conventional manner of the resulting 3-acylate of 3β,19-dihydroxy-Δ⁵-steroid to give the corresponding free 3β-19-dihydroxy-Δ⁵-steroid, which is finally treated under Oppenauer conditions for a period of time of the order of 10 minutes, thus affording the desired Δ⁴-3-keto-19-hydroxy steroid.

In accordance with the novel process of the present invention, the starting steroid, which is preferably a member of the androstane or pregnane series, is conventionally hydrogenated in the presence of a suitable catalyst, such as 5% palladium on charcoal, to give the correponding 19-hydroxy-3-keto-5α-steroid (II). The latter 19-alcohol (II) is treated conventionally with a sulfonic acid chloride, preferably derived from a hydrocarbon sulfonic acid of up to 8 carbon atoms, such as p-toluenesulfonic acid or methane sulfonic acid, in pyridine, preferably at 0° C., for a period of time of the order of 6 hours, to give the corresponding 19-sulfonate (III).

The 19-sulfonate (III) is treated with a base, selected from the group consisting of alkali metal lower alkoxides of up to 6 carbon atoms, such as sodium methoxide, potassium ethoxide, and the like, alkali metal amides, such as sodium amide, and alkali metal hydroxides, especially sodium hydroxide and potassium hydroxide, in a polar organic solvent, such as a lower alcohol, preferably methanol or ethanol, or a lower aliphatic amide of up to 8 carbon atoms, such as dimethylformamide or with an alkali metal hydride such as sodium hydride, preferably in a non-polar organic solvent such as a homocyclic aromatic solvent, especially toluene, thus affording the corresponding 2,19-cyclo-3-keto-steroid (IV).

Alternatively 3-keto-19(chloro, bromo, chloro-mercurio, or tri-lower alkyl-ammonium halide) steroids, prepared by conventional methods from the 19-hydroxy derivatives (II), may be similarly treated under alkaline conditions as specified above, to furnish the corresponding 2,19-cyclo-steroid derivatives.

The novel 2,19-cyclo-androstane derivatives of the present invention are prepared by the process exemplified as follows:

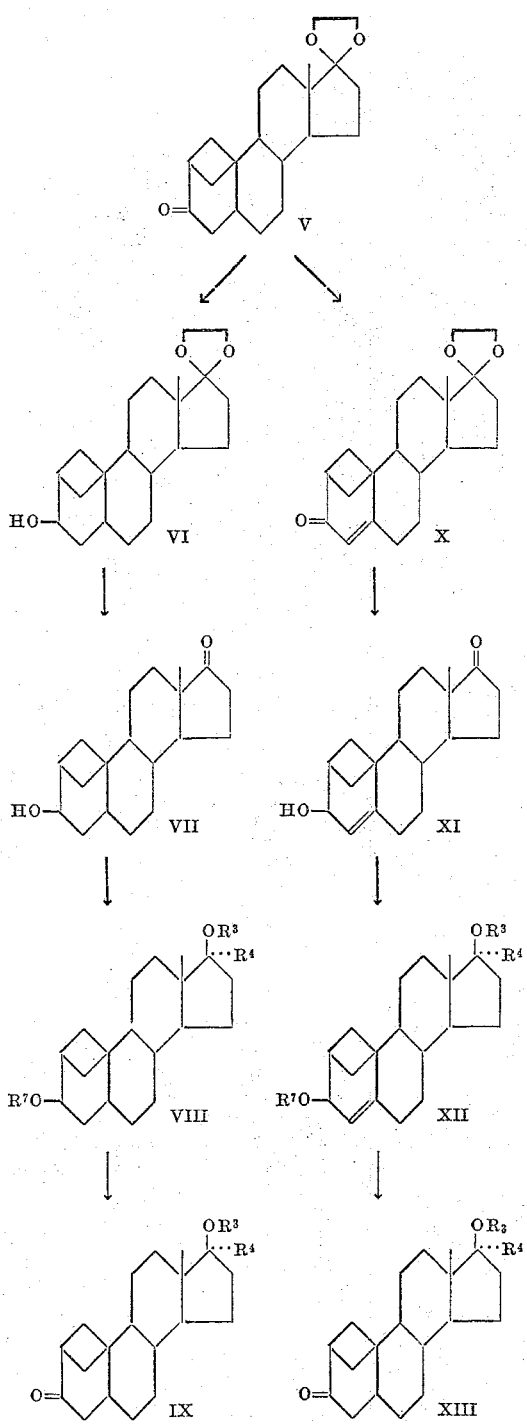

In the above formulae $R^3$, $R^4$, and $R^7$ have the same meaning as described above.

In practicing the process just outlined, the starting 17-cycloethylenedioxy - 2,19 - cyclo androstan-3-one (V), which is obtained in accordance with the process described hereinbefore, is treated with a double metal hydride, preferably lithium aluminium hydride, in an inert solvent such as tetrahydrofuran, to give 17-cycloethylenedioxy-2,19-cyclo-androstan-3β-ol (VI), which upon conventional hydrolysis in an acid medium affords 2,19-cyclo-androstan-3β-ol-17-one (VII). Treatment of the latter 17-ketone (VII) with a lower (alkyl, alkenyl or alkinyl) magnesium halide, such as methyl, vinyl, or ethinyl magnesium bromide, yields the corresponding 17α-lower (alkyl, alkenyl or alkinyl) 2,19-cyclo-androstane-3β,17β-diol (VIII: $R^3$=H, $R^4$=lower hydrocarbon). The latter 17α-substituted 3β,17β-diols (VIII: $R^3$=H, $R^4$=hydrocarbon) upon treatment with chromium trioxide, preferably in acetic acid, afford the corresponding 17α - substituted 2,19 - cyclo-androstan - 17β - ol-3-one derivatives (IX: $R^3$=H, $R^4$=hydrocarbon). Upon treatment of 2,19-cyclo-androstan-3β-ol-17-one (VII) with dihydropyrane in the presence of p-toluene-sulfonic acid and in the absence of moisture there is obtained the 3-tetrahydropyranylether of 2,19-cyclo-androstan-3β-ol-17-one, which is reduced with a double metal hydride, preferably lithium aluminum hydride, to give the 3-tetrahydropyranylether of 2,19-cyclo-androstane-3β,17β-diol. The latter compound upon conventional esterification with a suitable esterifying agent, such as acetic anhydride or caproic anhydride, in pyridine, affords the 17-acylate - 3 - tetrahydropyranylether of 2,19-cyclo-androstane-3β,17β-diol which upon conventional acid hydrolysis yields the corresponding 17-acylate of 2,19-cyclo-androstane-3β,17β-diol (VIII: $R^4$=H, $R^3$=acyl). The latter compound is oxidized, preferably with chromium trioxide in acetic acid to the corresponding acylate of 2,19-cyclo-androstan-17β-ol-3-one (IX: $R^4$=H, $R^3$=acyl). Conventional saponification of the two latter acylates in a basic medium, affords the corresponding 17β-free-alcohols.

17 - cycloethylenedioxy-2,19-cyclo-androstan-3-one (V) is treated with approximately one molar equivalents of N-bromosuccinimide, in a non-polar inert solvent such as carbon tetrachloride, to give the corresponding 4α-bromo-derivative, which is in turn dehydrobrominated with calcium carbonate in dimethylformamide, to produce 17-cycloethylenedioxy-2,19-cyclo-Δ⁴-androsten-3-one (X). The latter compound is reduced with lithium aluminum hydride or any other double metal hydride, to the corresponding 3β-alcohol which is, in turn, hydrolyzed under conventional conditions to the corresponding 2,19-cyclo-Δ⁴-androsten-3β-ol-17-one (XI). Reduction of the latter compound with a double metal hydride produces 2,19-cyclo - Δ⁴ - androstene - 3β,17β - diol (XII: $R^3$=$R^4$=H). Treatment of 2,19-cyclo-Δ⁴-androsten-3β-ol-17-one with a lower (alkyl, alkenyl or alkinyl) magnesium halide, such as methyl, vinyl, or ethinyl magnesium bromide, yields the corresponding 17α-lower (alkyl, alkenyl or alkinyl) 2,19 - cyclo - Δ⁴ - androstene - 3β,17β - diol (XII: $R^3$=H, $R^4$≠H). Treatment of the 2,19-cyclo-Δ⁴-androstene-3β,17β-diol compounds (XII), with approximately one molar equivalent of 2,3-dichloro-5,6-dicyano-1,4-benzoquinone, at room temperature for a period of time of the order of 3 hours, results in the production of the corresponding 2,19-cyclo - Δ⁴ - androsten-17β-ol-3-one derivatives (XIII).

The compounds of the present invention having the secondary hydroxyl group, are conventionally acylated in pyridine with an acylating agent such as anhydride or chloride of the hydrocarbon carboxylic acid of the type described hereinbefore, to give the corresponding acylates.

The compounds of the present invention having present in the molecule a tertiary 17β-hydroxyl group are conventionally acylated in the presence of p-toluenesulfonic acid with a suitable acylating agent, such as acetic anhydride or caproic anhydride, to give the corresponding 17β-tertiary acylates.

The following specific examples serve to illustrate but are not intended to limit the scope of the present invention:

PREPARATION 1

A mixture of 1 g. of Δ⁵-androstene-3β,19-diol-17-one 3-acetate (Bowers, A., U.S.P. appl. Ser. No. 194,716 filed May 14, 1962) 25 cc. of dry benzene, 5 cc. of ethylene glycol and 50 mg. of p-toluenesulfonic acid monohydrate was refluxed for 16 hours using a water separator. It was then washed with a sodium bicarbonate solution, water and subsequently dried and evaporated to dryness. Recrystallization from acetone-hexane yielded 17-cycloethylenedioxy-Δ⁵-androstene-3β,19-diol-3-acetate.

A solution of 1 g. of the latter acetate in 50 cc. of methanol was refluxed for 3 hours with 500 mg. of potassium hydroxide dissolved in 1 cc. of water; it was then poured into ice water, the precipitate collected, washed with water to neutral and dried, thus producing a crude compound which upon recrystallization from methylenechloride-ether afforded 17 - cycloethylenedioxy-Δ⁵-androstene-3β,19-diol.

A solution of 1 g. of the last named diol in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 10 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 17-cycloethylenedioxy-Δ⁴-androsten-19-ol-3-one.

Example I 1 g. of 17-cycloethylenedioxy-Δ⁴-androsten-19-ol-3-one dissolved in 50 cc. of ethyl acetate was hydrogenated overnight in the presence of 0.3 g. of a 5% palladium-on-charcoal catalyst at asmospheric pressure and room temperature. Removal of catalyst and solvent and crystallization of the residue from acetone furnished 17-cycloethylenedioxy-androstan-19-ol-3-one (Cpd. No. 1).

Following the same procedure, the starting compounds listed under I (obtained in accordance with Bowers U.S. pat. appl. Ser. No. 201,802 filed June 12, 1962) were respectively converted into the products set forth under II.

| I | Cpd. No. | II |
|---|---|---|
| Δ⁴-androsten-19-ol-3,17-dione | 2 | Androstan-19-ol-3,17-dione. |
| Δ⁴-pregnen-19-ol-3, 20-dione | 3 | Allopregnan-19-ol-3,20-dione. |
| 16α-methyl-Δ⁴-pregnen-19-ol-3, 20-dione. | 4 | 16α-methyl-allopregnan-19-ol 3,20-dione. |
| 16β-methyl-Δ⁴-pregnen-19-ol-3, 20-dione. | 5 | 16β-methyl-allopregnan-19-ol-3,20-dione. |
| 16α,17α-isopropylidenedioxy-Δ⁴-pregnen-19-ol-3,20-dione. | 6 | 16α,17α-isopropylidenedioxy-19-ol-3,20-dione. |
| Δ⁴-pregnene-17α, 19-diol-3,20-dione 17-acetate. | 7 | allopregnane-17α,19-diol-3,20-dione 17-acetate. |
| 16α-methyl-Δ⁴-pregnene-17α,19-diol-3,20-dione 17-acetate. | 8 | 16α-methyl-allopregnan-17α,19-diol-3,20-dione 17-acetate. |
| 17,20;20,21-bismethylenedioxy-Δ⁴-pregnen-19-ol-3-one. | 9 | 17, 20; 20, 21-bismethylenedioxy-allopregnan-19-ol-3-one. |
| 17α-methyl-Δ⁴-androstene-17β,19-diol-3-one. | 10 | 17α-methyl-androstane-17β-19-diol-3-one. |

Example II

A solution of 5 g. of 17-cycloethylenedioxy-androstan-19-ol-3-one (Cpd. No. 1) in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the tosylate of 17-cycloethylenedioxy-androstan-19-ol-3-one (Cpd. No. 11).

The compounds Nos. 2 to 8, inclusive, were treated in accordance with the above procedure, thus giving respectively:

Cpd. No.:

(12) The tosylate of androstan-19-ol-3,17-dione,
(13) The tosylate of allopregnan-19-ol-3,20-dione,
(14) The tosylate of 16α-methyl-allopregnan-19-ol-3,20-dione,
(15) The tosylate of 16β-methyl-allopregnan-19-ol-3,20-dione,
(16) The tosylate of 16α,17α-isopropylidenedioxy-allopregnan-19-ol-3,20-dione,
(17) The 17-acetate-19-tosylate of allopregnane-17α,19-diol-3,20-dione,
(18) The 17-acetate-19-tosylate of 16α-methyl-allopregnane-17α,19-diol-3,20-dione,
(19) The tosylate of 17,20;20,21-bismethylenedioxy- allopregnan-19-ol-3-one,
(20) The 19-tosylate of 17α-methyl-androstane-17β,19-diol-3-one,

Example III

One gram of the tosylate of 17-cycloethylenedioxy-androstan-19-ol-3-one (Cpd. No. 11) was dissolved in 50 cc. of hot 95% ethanol and thereafter was added 1 g. of sodium hydroxide. The resulting mixture was refluxed for 4 hours, then it was cooled, poured into water and extracted with ethyl acetate. The organic solution was washed with water, dried over anhydrous sodium sulfate and evaporated to dryness. Alumina chromatography afforded 17-cycloethylenedioxy-2,19-cycle-androstan-3-one. (Cpd. No. 21.)

Example IV

One gram of the tosylate of 17 cycloethylenedioxy-androstan-19-ol-3-one (Cpd. No. 11) was dissolved in 30 cc. of toluene and thereto was added 1 g. of sodium hydride suspended in mineral oil. The resulting mixture was refluxed for 5 hours. Then, 5 cc. of t-butanol were cautiously added to decompose the excess of hydride, and the whole was washed with water, dried and evaporated to dryness. Alumina chromatography of the residue, followed by crystallization from acetone-hexane yielded 17 - cycloethylenedioxy-2,19-cyclo-androstan-3-one (Cpd. No. 21).

Example V

The procedure described in Example III was repeated, except that sodium hydroxide was substituted by postassimum hydroxide and the time of reflux was shortened to 3 hours, thus giving the same Compound No. 21.

Example VI

The method of Example IV was repeated except that sodium hydride was substituted by lithium hydride and the reflux time was of 6 hours, thus yielding Compound No. 21.

Example VII 17-cycloethylenedioxy-androstan-19-ol-3-one (Cpd. No. 1) was treated in accordance with Example II, except that tosyl chloride was substituted by mesyl chloride, thus giving the mesylate of 17-cycloethylenedioxy-androstan-19-ol-3-one (Cpd. No. 22), which upon treatment by the procedures of Examples III and IV afforded in each case 17 - cycloethylenedioxy-2,19-cyclo-androstan-3-one (Cpd. No. 21).

Example VIII

The Compounds Nos. 12 to 20, inclusive, were treated by the procedure of Example IV, thus giving respectively:

Cpd. No:

(23) 2,19-cyclo-androstane-3,17-dione,
(24) 2,19-cyclo-allopregnane-3,20-dione,
(25) 16α-methyl-2,19-cyclo-allopregnane-3,20-dione,
(26) 16β-methyl-2,19-cyclo-allopregnane-3,20-dione,
(27) 16α,17α-isopropylidenedioxy-2,19-cyclo-allopregnane-3,20-dione,
(28) 2,19-cyclo-allopregnan-17α-ol-3,20-dione,
(29) 16α-methyl-2,19-cyclo-allopregnan-17α-ol-3,20-dione,
(30) 17,20;20,21-bismethylenedioxy-2,19-cyclo-allopregnan-3-one,
(31) 17α-methyl-2,19-cyclo-androstan-17β-ol-3-one.

Example IX

A solution of 1 g. of 17-cycloethylenedioxy-2,19-cycloandrostan-3-one (Cpd. No. 21) in 50 cc. of tetrahydrofuran was added over a 30 minute period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 17-cycloethylenedioxy-2,19-cyclo-androstan-3$\beta$-ol (Cpd. No. 32).

*Example X*

A solution of 500 mg. of Compound No. 32 in 25 cc. of acetone was treated with 0.1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 2,19 - cyclo - androstan-3$\beta$-ol-17-one (Cpd. No. 33).

*Example XI*

A solution of 5 g. of 2,19-cyclo-androstan-3$\beta$-ol-17-one (Cpd. No. 33) in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 17$\alpha$-methyl - 2,19 - cyclo-androstane-3$\beta$,17$\beta$-diol (Cpd. No. 34).

*Example XII*

The Compound No. 33, was treated in accordance with Example XI, except that methyl magnesium bromide was substituted by vinyl magnesium bromide, thus furnishing 17$\alpha$-vinyl-2,19-cyclo-androstane - 3$\beta$,17$\beta$ - diol (Cpd. No. 35).

*Example XIII*

The Compound No. 33, was treated following the procedure described in Example XI, with the exception that ethinyl magnesium bromide was used instead of methyl magnesium bromide, thus giving 17$\alpha$-ethinyl-2,19-cyclo-androstane-3$\beta$,17$\beta$-diol (Cpd. No. 36).

*Example XIV*

A solution of 1.1 equivalents of chromic acid in 5 cc. of 80% acetic acid was added dropwise to a stirred solution of 1 g. of 17$\alpha$-methyl-2,19-cyclo-androstane-3$\beta$,17$\beta$-diol (Cpd. No. 34) in 10 cc. of glacial acetic acid, while the temperature was maintained around 20° C. After 2 hours at room temperature, the mixture was poured into ice water and the formed precipitate collected, washed with water and recrystallized from methanol, thus giving 17$\alpha$-methyl-2,19-cyclo-androstan-17$\beta$-ol-3-one (Cpd. No. 37).

Following the same procedure there were treated the Compounds Nos. 35 and 36, thus affording respectively: 17$\alpha$-vinyl - 2,19 - cyclo-androstan-17$\beta$-ol-3-one (Cpd. No. 38) and 17$\alpha$-ethinyl - 2,19 - cyclo-androstan-17$\beta$-ol-3-one (Cpd. No. 39).

*Example XV*

4.2 g. of 17-cycloethylenedioxy-2,19-cyclo-androstan-3-one (Cpd. No. 21) in 200 cc. of carbon tetrachloride was refluxed with 1.1 molar equivalents of N-bromosuccinimide for 1½ hours. The mixture was filtered to eliminate the succinimide that is formed during the reaction. The filtrate was evaporated to dryness under reduced pressure. Recrystallization from methylene-chloride-hexane gave 4$\alpha$-bromo-17-cycloethylenedioxy-2,19-cyclo-androstan-3-one (Cpd. No. 40).

1 g. of the above compound was refluxed with 1 g. of calcium carbonate and 50 cc. of dimethylformamide for 30 minutes. The mixture filtered, the solvent evaporated under reduced pressure and the residue crystallized from acetone-hexane to afford 17-cycloethylenedioxy-2,19-cyclo-$\Delta^4$-androsten-3-one (Cpd. No. 41).

*Example XVI*

The Compound No. 41 was treated successively in accordance with Examples IX and X, thus affording respectively: 17-cycloethylenedioxy - 2,19 - cyclo-$\Delta^4$-androsten-3$\beta$-ol (Cpd. No. 42) and 2,19-cyclo-$\Delta^4$-androsten-3$\beta$-ol-17-one (Cpd. No. 43).

*Example XVII*

The Compound No. 43 was treated according to Example IX, to produce: 2,19-cyclo-$\Delta^4$-androstene-3$\beta$,17$\beta$-diol (Cpd. No. 44).

*Example XVIII*

The Compound No. 43 was treated with methyl magnesium bromide, with vinyl magnesium bromide, with ethinyl magnesium bromide in accordance with Examples XI, XII and XIII, respectively, thus giving: 17$\alpha$-methyl-2,19-cyclo-$\Delta^4$-androstene - 3$\beta$,17$\beta$ - diol (Cpd. No. 45) 17$\alpha$-vinyl-2,19-cyclo-$\Delta^4$-androstene-3$\beta$,17$\beta$-diol (Cpd. No. 46) and 17$\alpha$ - ethinyl-2,19-cyclo-$\Delta^4$-androstene-3$\beta$,17$\beta$-diol (Cpd. No. 47).

*Example XIX*

A mixture of 1 g. of 2,19-cyclo-$\Delta^4$-androstene-3$\beta$,17$\beta$-diol (Cpd. No. 44) in 20 cc. of dioxane, and 1.1 molar equivalents of 2,3-dichloro-5,6-dicyano-1,4-benzoquinone was kept at room temperature for 3 hours. The hydroquinone formed during the reaction was filtered off, and the filtrate evaporated to dryness. The residue was dissolved in acetone and filtered through 20 g. of alumina. Crystallization from acetone-hexane gave 2,19-cyclo-$\Delta^4$-androsten-17$\beta$-ol-3-one (Cpd. No. 48).

Following the same procedure, there were treated the Compounds Nos. 45, 46 and 47, thus giving respectively: 17$\alpha$-methyl-2,19-cyclo-$\Delta^4$-androsten-17$\beta$-ol-3-one (Cpd. No. 49), 17$\alpha$-vinyl-2,19-cyclo-$\Delta^4$-androsten-17$\beta$-ol - 3-one (Cpd. No. 50), and 17$\alpha$-ethinyl-2,19-cyclo-$\Delta^4$-androsten-17$\beta$-ol-3-one (Cpd. No. 51).

*Example XX*

A mixture of 1 g. of Compound No. 48, 4 cc. of pyridine and 2 cc. of acetic anhydride was kept at room temperature overnight, poured into ice water, the formed precipitate was filtered, washed with water and dried. Crystallization from acetone-hexane gave 2,19-cyclo-$\Delta^4$-androsten-17$\beta$-ol-3-one acetate (Cpd. No. 52).

*Example XXI*

By the procedure of Example XX, but using propionic anhydride and caproic anhydride instead of acetic anhydride there were respectively obtained 2,19-cyclo-$\Delta^4$-androsten-17$\beta$-ol-3-one propionate (Cpd. No. 53) and 2,19-cyclo-$\Delta^4$-androsten-17$\beta$-ol-3-one caproate (Cpd. No. 54).

*Example XXII*

To a solution of 5 g. of 17$\alpha$-methyl-2,19-cyclo-androstan-17$\beta$-ol-3-one (Cpd. No. 37) in 100 cc. of anhydrous benzene there were added 1 g. of p-toluenesulfonic acid and 10 cc. of enanthic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 17$\alpha$ - methyl-2,19-cyclo-androstan-17$\beta$-ol-3-one enanthate (Cpd. No. 55).

The Compounds Nos. 38, 39, 49, 50 and 51 were treated by the same procedure, thus affording respectively: 17α-vinyl-2,19-cyclo-androstan-17β - ol - 3-one enanthate (Cpd. No. 56), 17α-ethinyl-2,19-cyclo-androstan-17β-ol-3-one enanthate (Cpd. No. 57), 17α-methyl-2,19-cyclo-Δ⁴-androsten-17β-ol-3-one enanthate (Cpd. No. 58), 17α-vinyl-2,19-cyclo-Δ⁴-androsten-17β - ol - 3 - one enanthate (Cpd. No. 59), and 17α-ethinyl-2,19-cyclo-Δ⁴-androsten-17β-ol-3-one enanthate (Cpd. No. 60).

*Example XXIII*

The starting compounds of Example XXII were treated by the procedure described in that example, with the exception that enanthic anhydride was substituted by acetic anhydride and caproic anhydride thus affording respectively the acetates and caproates of said starting compounds.

*Example XXIV*

The Compounds Nos. 12 to 20, inclusive, were treated by the procedure of Example III, thus affording respectively the Compounds Nos. 23 to 31, inclusive, which were identical with those obtained in Example VIII.

*Example XXV*

2 cc. of dihydropyrane were added to a solution of 1 g. of 2,19-cyclo-androstan-3β-ol-17-one (Cpd. No. 33) in 15 cc. of benzene and about 1 cc. was distilled to remove moisture. 0.4 g. of p-toluenesulfonic acid were added to the cooled solution, which was then allowed to stand at room temperature for 4 days. The solution was washed with sodium carbonate and water, dried and evaporated. The residue was chromatographed on 15 g. of neutral alumina. Crystallization of the fractions eluted with hexane from pentane yielded the 3-tetrahydropyranylether of 2,19-cyclo-androstan-3β-ol-17-one (Cpd. No. 61).

The latter compound was treated successively according to Examples IX and XX thus yielding respectively: the 3-tetrahydropyranylether of 2,19-cyclo-androstane-3β,17β-diol (Cpd. No. 62) and the 3-tetrahydropyranylether-17-acetate of 2,19-cyclo - androstane - 3β,17β - diol (Cpd. No. 63).

*Example XXVI*

To a solution of 1 g. of Compound No. 63 in 30 cc. of acetic acid was added 0.5 cc. of 2 N hydrochloric acid. After 5 hours at room temperature, ice water was added and the product extracted with methylene chloride. The extract was washed to neutral, dried over anhydrous sodium sulfate and evaporated to dryness. Crystallization from acetone-hexane yielded the 17-acetate of 2,19-cyclo-androstane-3β,17β-diol (Cpd. No. 64).

*Example XXVII*

The Compound No. 64 was treated according to Example XIV, to produce the 17-acetate of 2,19-cyclo-androstan-17β-ol-3-one (Cpd. No. 65).

*Example XXVIII*

A suspension of 1 g. of Compound No. 65 in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 2,19-cyclo-androstan-17β-ol-3-one (Cpd. No. 66).

Following the same procedure there was treated Compound No. 64, to give 2,19-cyclo-androstane-3β,17β-diol (Cpd. No. 67).

*Example XXIX*

The Compounds Nos. 34, 35, 36, 45, 46, and 47, were treated following the procedure described in Example XXII, thus affording respectively:
Cpd. No.:
(68) 17α - methyl -2,19-cyclo-androstane-3β,17β-diol di-enanthate

(69) 17α-vinyl-2,19-cyclo-androstane-3β,17β-diol dienanthate
(70) 17α-ethinyl-2,19-cyclo-androstane - 3β,17β - diol dienanthate
(71) 17α-methyl-2,19-cyclo-Δ⁴-androstene-3β,17β-diol dienanthate
(72) 17α - vinyl-2,19-cyclo-Δ⁴-androstene-3β,17β-diol dienanthate,
(73) 17α-ethinyl-2,19-cyclo-Δ⁴-androstene-3β,17β-diol dienanthate.

*Example XXX*

The Compounds Nos. 34, 35, 36, 45, 46, and 47, were treated in accordance with Example XX, to give respectively:
Cpd. No.:
(74) 17α-methyl - 2,19 - cyclo-androstane - 3β,17β - diol 3-acetate
(75) 17α-vinyl-2,19-cyclo-androstane-3β,17β-diol 3-acetate
(76) 17α-ethinyl-2,19-cyclo-androstane-3β,17β-diol 3-acetate
(77) 17α-methyl-2,19-cyclo-Δ⁴-androstene - 3β,17β - diol 3-acetate
(78) 17α - vinyl - 2,19 - cyclo-Δ⁴-androstene-3β,17β-diol 3-acetate
(79) 17α-ethinyl-2,19-cyclo-Δ⁴-androstene - 3β,17β - diol 3-acetate.

*Example XXXI*

The Compound No. 74 was treated according to Example XXII, to produce: 17α-methyl-2,19-cyclo-androstane-3β,17β-diol 3-acetate-17-enanthate (Cpd. No. 80).

*Example XXXII*

A solution of 3 g. of Compound No. 11 in 40 cc. of dimethyl formamide was treated with 4 g. of sodium methoxide and heated to reflux for 10 minutes. After heating at 95° C. for 30 minutes, the reaction was cooled, poured into water and extracted with ether. Evaporation of the organic layer followed by crystallization of the residue, yielded 17-cycloethylenedioxy-2,19-cyclo-androstan-3-one (Cpd. No. 21).

I claim:
1. A compound of the following formula:

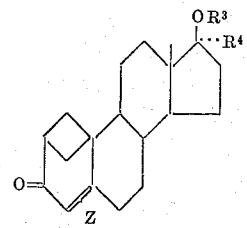

wherein R³ is selected from the group consisting of hydrogen and a hydrocarbon carboxylic acyl group of less than 12 carbon atoms; R⁴ is a member of the group consisting of hydrogen, lower alkyl, lower alkenyl and lower alkinyl and Z is selected from the group consisting of a double bond and a saturated linkage between C–4 and C–5.

2. 17α-methyl-2,19-cyclo-androstan-17β-ol-3-one.
3. 17α-vinyl-2,19-cyclo-androstan-17β-ol-3-one.
4. 17α-ethinyl-2,19-cyclo-androstan-17β-ol-3-one.
5. 17α-methyl-2,19-cyclo-Δ⁴-androsten-17β-ol-3-one.
6. 17α-vinyl-2,19-cyclo-Δ⁴-androsten-17β-ol-3-one.
7. 17α-ethinyl-2,19-cyclo-Δ⁴-androsten-17β-ol-3-one.
8. 2,19-cyclo-Δ⁴-androsten-17β-ol-3-one.
9. The hydrocarbon carboxylic acylates of less than 12 carbon atoms of 2,19-cyclo-Δ⁴-androsten-17β-ol-3-one.

10. A compound of the following formula:

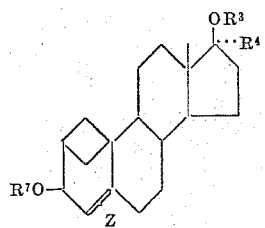

wherein $R^3$ and $R^7$ are selected from the group consisting of hydrogen and a hydrocarbon carboxylic acyl group of less than 12 carbon atoms; $R^4$ is a member of the group consisting of hydrogen, lower alkyl, lower alkenyl and lower alkinyl and Z is selected from the group consisting of a double bond and a saturated linkage between C-4 and C-5.

11. 17α-methyl-2,19-cyclo-androstane-3β,17β-diol.
12. 17α-vinyl-2,19-cyclo-androstane-3β,17β-diol.
13. 17α-ethinyl-2,19-cyclo-androstane-3β,17β-diol.
14. 17α-methyl-2,19-cyclo-Δ⁴-androstene-3β,17β-diol.
15. 17α-vinyl-2,19-cyclo-Δ⁴-androstene-3β,17β-diol.
16. 17α-ethinyl-2,19-cyclo-Δ⁴-androstene-3β,17β-diol.

17. A process for the production of 2,19-cyclo-3-ketosteroids which comprises treating the 19-sulfonate of a 19-hydroxy-3-keto steroid selected from the group consisting of the androstane and pregnane series, wherein the sulfonate grouping is derived from a hydrocarbonsulfonic acid of up to 8 carbon atoms, with a reagent selected from the group consisting of alkali metal hydroxides, alkali metal lower alkoxides and alkali metal amides in a polar organic solvent and alkali metal hydrides in a non-polar organic solvent.

18. The process of claim 17 wherein the 19-sulfonate is a 19-tosylate and the reagent is an alkali metal hydroxide in a lower alcohol.

19. The process of claim 17 wherein the 19-sulfonate is the 19-tosylate and the reagent is an alkali metal hydride in a homocyclic aromatic solvent.

20. The process of claim 18 wherein the reagent is sodium hydroxide in ethanol.

21. The process of claim 19 wherein the reagent is sodium hydride in toluene.

No references cited.